Figure 1:
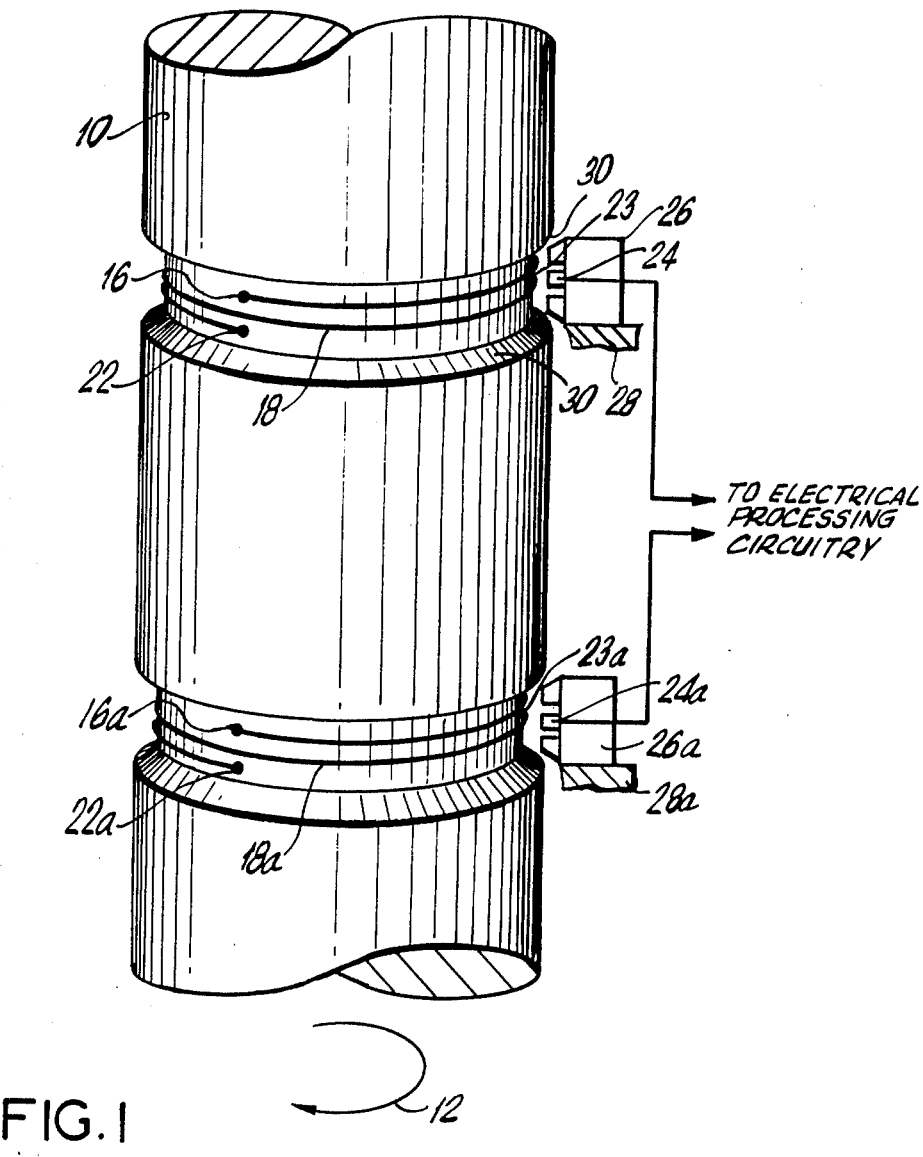

United States Patent [19]

Fitch

[11] 4,165,913
[45] Aug. 28, 1979

[54] ROTARY OPTICAL COUPLER

[75] Inventor: Arthur H. Fitch, Berkeley Heights, N.J.

[73] Assignee: Lockheed Electronics Company, Inc., Plainfield, N.J.

[21] Appl. No.: 797,912

[22] Filed: May 18, 1977

[51] Int. Cl.² .............................................. G02B 5/14
[52] U.S. Cl. ............................. 350/96.15; 350/96.29; 250/227
[58] Field of Search .............. 350/96.15, 96.29, 96.19; 250/227, 570; 358/200; 340/189 R, 189 M

[56] References Cited

U.S. PATENT DOCUMENTS

| | | | |
|---|---|---|---|
| 2,506,672 | 5/1950 | Kell et al. | 250/227 |
| 3,510,667 | 5/1970 | Cleveland et al. | 250/227 |
| 3,742,486 | 6/1973 | Skidmore | 250/227 |
| 3,809,455 | 5/1974 | Pekau | 350/96.19 |
| 3,922,714 | 11/1975 | Delavie | 250/227 |

OTHER PUBLICATIONS

R. G. Burke, et al., "Fiber Optic Repeater Bypass Switch", IBM Tech. Disclosure Bulletin, vol. 18, No. 2, Jul. 1975, p. 481–482.

*Primary Examiner*—Rolf G. Hille
*Attorney, Agent, or Firm*—Hopgood, Calimafde, Kalil, Blaustein & Lieberman

[57] ABSTRACT

Binary information developed on a rotating member is applied in the form of light signals to one end of an optical fiber which is disposed about the rotating member and positioned adjacent a stationary light detector. The surface of the optical fiber is roughened so that a portion of the light that axially propagates along the optical fiber is transmitted through the roughened wall of the fiber and is received at the light detector. The latter converts the thus received light signals into corresponding binary signals. In accordance with one aspect of the present invention, plural independent data coupling channels may be employed.

7 Claims, 2 Drawing Figures

ROTARY OPTICAL COUPLER

The present invention relates generally to data transmission and, more particularly, to physically non-contacting apparatus for coupling data between rotating and stationary members.

It is frequently necessary to transmit information generated on a rotating member, such as transducer or receiver laden shaft of a rotating antenna or gun mount, to a companion stationary member where the information can be processed for subsequent utilization. Data transmission from a rotating to a stationary member has heretofore generally been performed by the use of slip rings, telemetering links, or the like. Slip rings, and particularly the brushes conventionally used in slip rings are, however, subject to wear and failure; require periodic replacement and are a notorious source of electrical noise. In most data transmission systems, the use of slip rings presents the most significant source of possible error and failure. Similarly, radio telemetering signal coupling apparatus has been a source of system complexity, expense, and channel cross-talk and other errors.

It is thus an object of the present invention to provide improved data coupling apparatus.

It is an object of the present invention to provide more specifically, apparatus for bilaterally transmitting data between associated rotating and stationary members which does not require the use of mechanical components such as slip rings, complex electronic telemetering circuitry, or the like.

It is another object of the present invention to provide a reliable, relatively inexpensive data transmission system.

To these ends, the data transmitting apparatus of the invention includes an optical fiber arranged about the periphery of the rotating member for rotation therewith. Binary data developed on the rotating member is applied in the form of light signals to one end of the optical fiber. The outer surface of the fiber is roughened or etched so that a portion of the light being conducted axially through the fiber radially escapes through the wall surface of the fiber. This transmitted light is detected by a stationary light detector positioned adjacent, and in optical communication with the rotating optical fiber. The stationary detector converts the received light signals to corresponding binary electrical signals.

Figure 2:
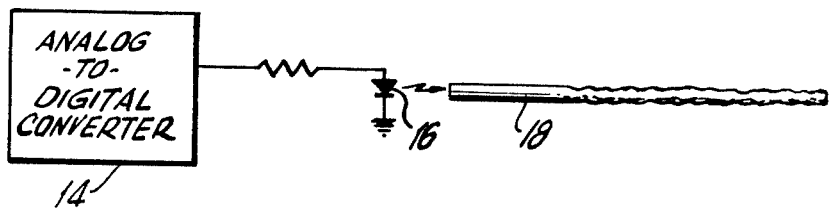

To the accomplishment of the above, and to such other aspects of the invention as may hereinafter appear, the present invention relates to a rotary data transmitter substantially as defined in the appended claims and as described in the specification, taken together with the accompanying drawing, in which:

FIG. 1 is a schematic elevation view of rotary data coupling apparatus according to an embodiment of the invention; and FIG. 2 is a schematic illustration of the manner in which binary light signals may be applied to the optical fiber of the data transmitter of FIG. 1.

The data transmitter of the instant invention transmits data produced on a rotating member, herein shown as a shaft 10, which rotates about a central axis in the direction of the arrow 12, to a separate stationary or nonrotating member. As hereinafter described, the transmitted data may be in binary form and may typically embody measured and/or computed or derived information generated by electrical structures secured to the shaft. This data may be derived in any known manner, such as by an analog-to-digital converter 14 (FIG. 2) operating upon multiplexed transducer outputs or the like.

The binary signal generated on the rotating member is converted into a corresponding series of light or optical pulses in any manner per se well known to those skilled in the art, as by a light-emitting diode (LED) connected to the output of the analog-to-digital converter 14 or other electrical digital voltage source. The LED 16 is positioned immediately adjacent, and is thus optically coupled with, one end of an optical fiber 18 which is terminated in any light absorbing load or ballast 22. As shown in FIG. 1, optical fiber 18 is arranged about the periphery of shaft 10, preferably as shown, within a circumferential annular recess or groove 23 formed in the periphery of the shaft. Plural turns of fiber 18 are shown, but one turn will suffice.

In a conventional optical fiber, light applied at one end of the fiber is transmitted under conditions of total internal reflection so that all the light propagates along the longitudinal axis of the fiber and no light is transmitted laterally through the fiber walls. However, if the surface of the fiber is roughened, as by sand blasting or other mechanical abraidings, a portion of the light being axially propagated through the fiber leaks out radially through the walls of the optical fiber.

The partial lateral light transmission from the optical fibers is detected by a light detector 24, for example, a photodiode or optical fiber terminating at photodiode, mounted on a stationary detector head 26. The head 26 physically projects into the annular recess 23 to be in close proximity and optical communication with the outer wall of optical fiber 18. Detector head 26 is mounted on a fixed platform as indicated at 28. The output of photodiode 24, which in a known manner converts the detected light pulses into corresponding electrical signals, is connected to appropriate electrical processing circuitry (not shown) which processes the electrical signals produced by the photodiodes.

In operation, binary light pulses are produced by LED 16 in response to the energization by pulses applied thereto. These light pulses are applied to one end of the optical fiber 18 and are propagated along the optical fiber. As a result of the roughened surface of the optical fiber wall, a portion of the transmitted binary light pulses passes outward through the wall of the optical fiber and is detected by the detector 24. Detector 24 converts the detected light pulses to electrical pulse data signals, which are then processed in the external processing circuitry. It will be appreciated that by positioning the end of the photodetector 24 within the annular recess 23, some of the light laterally transmitted from the optical fiber is reflected from the sloping wall surfaces 30 that define the recess 24, thereby optimizing the amount of light from the fiber that is received at the detector. Further and perhaps more importantly, the recess 23- proximate head 26 reduce electrical cross talk when more than one data channel is employed, as below discussed.

If desired, and as shown in FIG. 1, plural additional data coupling channels may be utilized, one such additional channel being shown in FIG. 1. A second optical fiber 18a, which also has its surface roughened, is wound around the periphery of shaft 10 in a second annular recess 23a axially spaced from recess 23. Fiber 18a receives binary light pulse signals corresponding to a second source of information from a second LED (not shown). These light pulses are partially transmitted through the wall of fiber 18a and are detected by a second stationary photodetector 24a. Detector 24a converts the detected light signals to a second series of electrical binary signals, which may also be applied to the external processing circuitry.

It will be appreciated from the foregoing description of an embodiment of the invention that apparatus has been provided for accurately and reliably transmitting binary data developed on a rotating member, such as a shaft, to a stationary detector and signal processor without the use of complex mechanical or electrical components. It will also be appreciated that, if desired, the invention may also be employed by reversing the arrangement of the components (i.e., a shaft-counted detector and a surrounding, stationary leaky light pulsed filter) to transmit data from a stationary source to a rotating detector in one or more channels.

Accordingly, it will be understood that these and other modifications may be made to the embodiment of the invention herein described without departing from the spirit and scope of the present invention.

What is claimed is:

1. Data coupling apparatus for transmitting data generated on one of a rotating member and a nonrotating member to the other of said member, said apparatus comprising an optical fiber carried by one of said rotating and nonrotating members and adapted to receive optical signals at one axial end thereof, optical detecting means in optical communication with the outer wall surface of said optical fiber and carried by the other of said rotating and non-rotating members, the outer wall surface being modified to allow a portion of light propagating axially through said optical fiber to pass through said outer wall surface to said optical detecting means, in which said rotating member is a rotating shaft, said optical fiber being disposed about the periphery of said shaft and rotating therewith.

2. The apparatus of claim 1, in which an annular recess is formed in said shaft, said optical fiber being received in said shaft.

3. Apparatus for transmitting data between a rotating member and a nonrotating member, said apparatus comprising an optical fiber carried by one of said rotating and nonrotating members and adapted to receive optical signals at one axial end thereof, optical detecting means in optical communication with the outer wall surface of said optical fiber and carried by the other of said rotating and nonrotating members, the outer wall surface being modified to allow a portion of light propagating axially through said optical fiber to pass through said outer wall surface to said optical detecting means, in which said rotating member is a rotating shaft, said optical fiber being disposed about the periphery of said shaft and rotating therewith, in which an annular recess is formed in said shaft, said optical fiber being received in said shaft, in which said shaft includes at least one sloping annular wall formed adjacent said annular recess and comprising means for reflecting laterally transmitted light from said optical fiber to said detecting means.

4. The apparatus of claim 3, further comprising means for producing light pulses positioned adjacent said one axial end of said optical fiber.

5. The apparatus of claim 4, further comprising a second annular recess formed in said shaft and axially spaced from said first recess, a second optical fiber adapted to have optical signals applied at one end thereof and having its outer wall surface modified to permit a portion of the light passing axially therethrough to be transmitted through said modified outer wall surface, second stationary optical detecting means in optical communication with the wall surface of said second optical fiber.

6. The apparatus of claim 1, further comprising means for producing light pulses positioned adjacent said one axial end of said optical fiber to axially inject said light pulses into and along said fiber.

7. Apparatus for transmitting data between a rotating member and a nonrotating member, said apparatus comprising an optical fiber carried by one of said rotating and nonrotating members and adapted to receive optical signals at one axial end thereof, optical detecting means in optical communication with the outer wall surface of said optical fiber and carried by the other of said rotating and nonrotating members, the outer wall surface being modified to allow a portion of light propagating axially through said optical fiber to pass through said outer wall surface to said optical detecting means, wherein said rotating member includes a circumferential recess, said fiber being disposed in said recess, and further comprising a head including said detecting means projecting into said recess.

* * * * *